Dec. 9, 1969    F. J. CANTALUPO ET AL    3,482,459
LIMIT SWITCHES
Filed Jan. 26, 1968    2 Sheets-Sheet 1

Inventors.
Francis J. Cantalupo,
Raymond P. Setka.
By. George A. Achind
Attys.

Dec. 9, 1969  F. J. CANTALUPO ETAL  3,482,459
LIMIT SWITCHES
Filed Jan. 26, 1968  2 Sheets-Sheet 2

Inventors.
Francis J. Cantalupo, &
Raymond P. Setka.
By George A. Achurind
Atty.

United States Patent Office 3,482,459
Patented Dec. 9, 1969

3,482,459
LIMIT SWITCHES
Francis J. Cantalupo and Raymond P. Setka, Chicago, Ill.,
   assignors to Crane Co., Chicago, Ill., a corporation of
   Illinois
      Filed Jan. 26, 1968, Ser. No. 700,997
            Int. Cl. F16h 27/02, 29/20
U.S. Cl. 74—89.15                                       5 Claims

ABSTRACT OF THE DISCLOSURE

A limit switch system for use in a motor driven valve actuator. A screw having oppositely-handed threaded portions is flanked by banks of cam-operable limit switches. Each of the thread portions of the screw has mounted thereon an interiorly threaded cam carrier. Carried by the cam carriers are positionally adjustable cam means which are adapted to actuate the limit switches. The screw is rotated in accordance with operation of the valve actuator, and the consequent movement of the cam carriers along the screw results in actuation of the limit switches in a preselected sequence, thus initiating various circuit control and indicator functions.

BACKGROUND—SUMMARY—PRIOR ART

This invention relates to motor driven valve arrangements and, more particularly, to an improved limit switch system for use in connection with a motor driven valve actuator.

In motor driven valve actuators, such as those described and claimed in United States Patents No. 3,239,616 and No. 3,234,818 (both owned by the assignee of this application), it is normally required to provide automatic control of current to the electric motor and automatic switching or various electrical interlocks. In addition, is desirable, and often mandatory under codes and specifications, to provide means, such as lights or mechanical pointers, for indicating valve positions.

These circuit control and indicating functions are typically initiated and regulated by the use of a system of limit switches adapted to be mechanically actuated in accordance with the positioning of the valving members. Such systems have heretofore been highly complex from a mechanical standpoint, and difficult and expensive to manufacture, install and maintain.

The present invention is directed toward a greatly simplified and improved switch system for use in connection with the motor driven valve actuators which provides, a low cost, a large and flexible switching capability in a small space, with minimal mechanical complexity and high reliability. In accordance with the invention, there is provided a novel limit switch assembly including a screw adapted to be rotated in accordance with actuation of the valve. The screw has oppositely-handed thread portions and is flanked by banks of cam-operable limit switches. At least one interiorly threaded cam carrier is mounted on each of the threaded portions of the screw, and the cam carriers carry cam means for actuating the limit switches. As the screw rotates, the carriers move therealong, and the cam means open or close the limit switches in a predetermined sequence, thus initiating and regulating the various circuit control and indicator functions of the valve actuator.

BRIEF DESCRIPTION OF DRAWINGS

The foregoing advantages and features of the present invention together with others, will be more fully understood by considering the remainder of the specification and the claims, with illustrative reference to the drawings, in which:

FIGURE 4 is an end elevational view of an exemplary cam carrier for use therein.

DESCRIPTION OF THE EXEMPLARY EMBODIMENT

Figure 1:
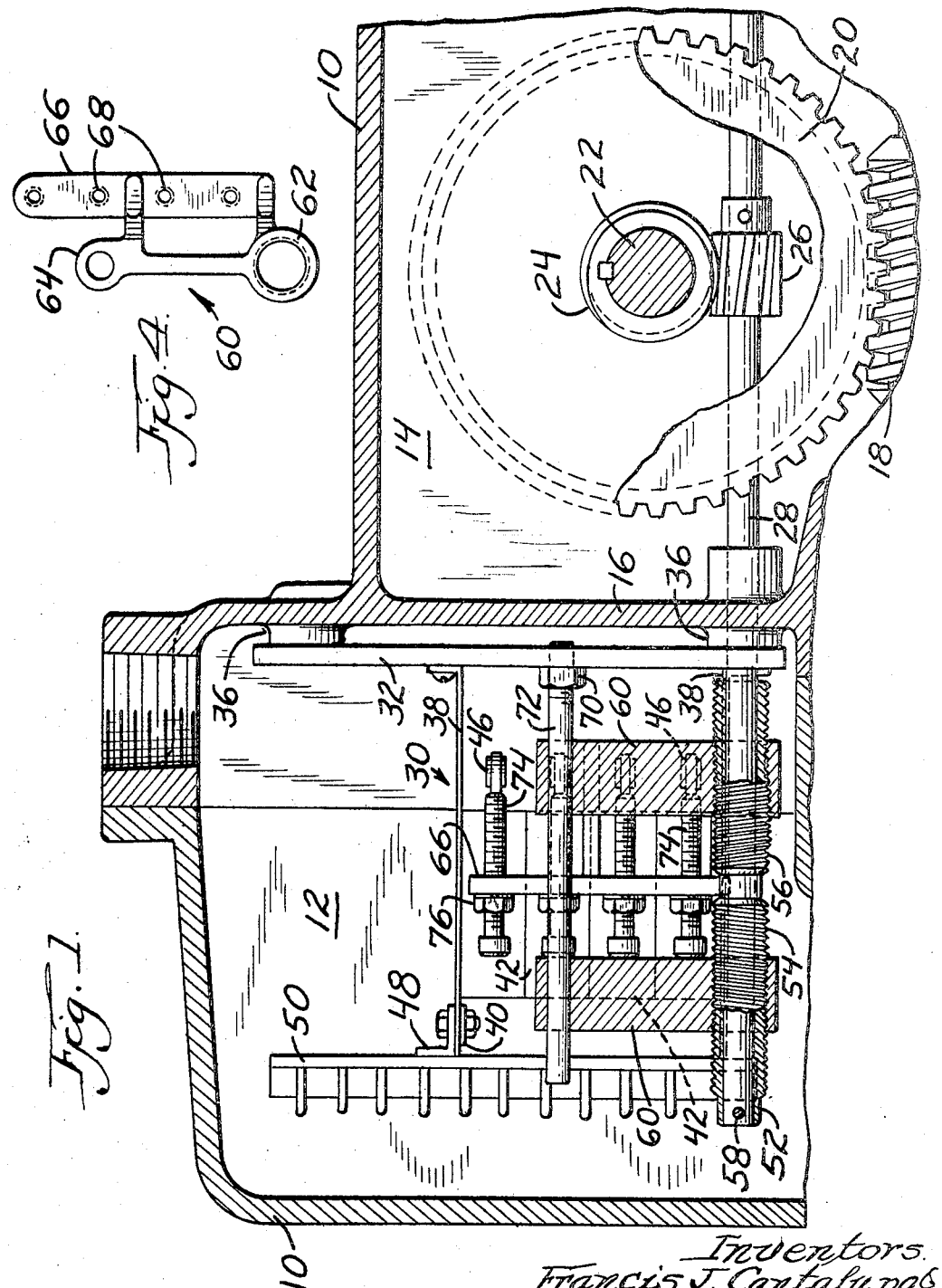
FIGURE 1 is a sectional side elevational view of a portion of a motor driven valve actuator, illustrating an exemplary embodiment of a novel limit switch assembly.

Illustrated in the drawings, particularly FIGURE 1, is a portion of a motor driven valve actuator including a housing 10 which defines a switching chamber 12 and a gearing chamber 14 separated by an interior wall 16. Located in the gearing chamber 14 is a worm 18 which is adapted to be rotated by the driven shaft of an electric motor (not shown). The worm 18 drives a worm gear 20 which is mounted on a clutch shaft 22. As described in greater detail in United States Patents No. 3,239,616 and No. 3,234,818, referred to above, the clutch shaft 22 operates through a suitable gearing arrangement to actuate the valve closure member, and the worm 18 cooperates with means for limiting the torque applied by the clutch shaft. Also not shown in the present drawings is a declutching arrangement which permits the clutch shaft 22 to be rotated by means of a hand wheel, thus providing for selective manual actuation in addition to motor actuation.

Keyed to the clutch shaft 22 is a take-off gear 24 which drives a pinion 26. The pinion is attached to a shaft 28 which passes from the gearing chamber 14, through the wall 16, into the switching chamber 12. Also included in the switching chamber 12 is a limit switch assembly generally denoted by the numeral 30.

Figure 2:
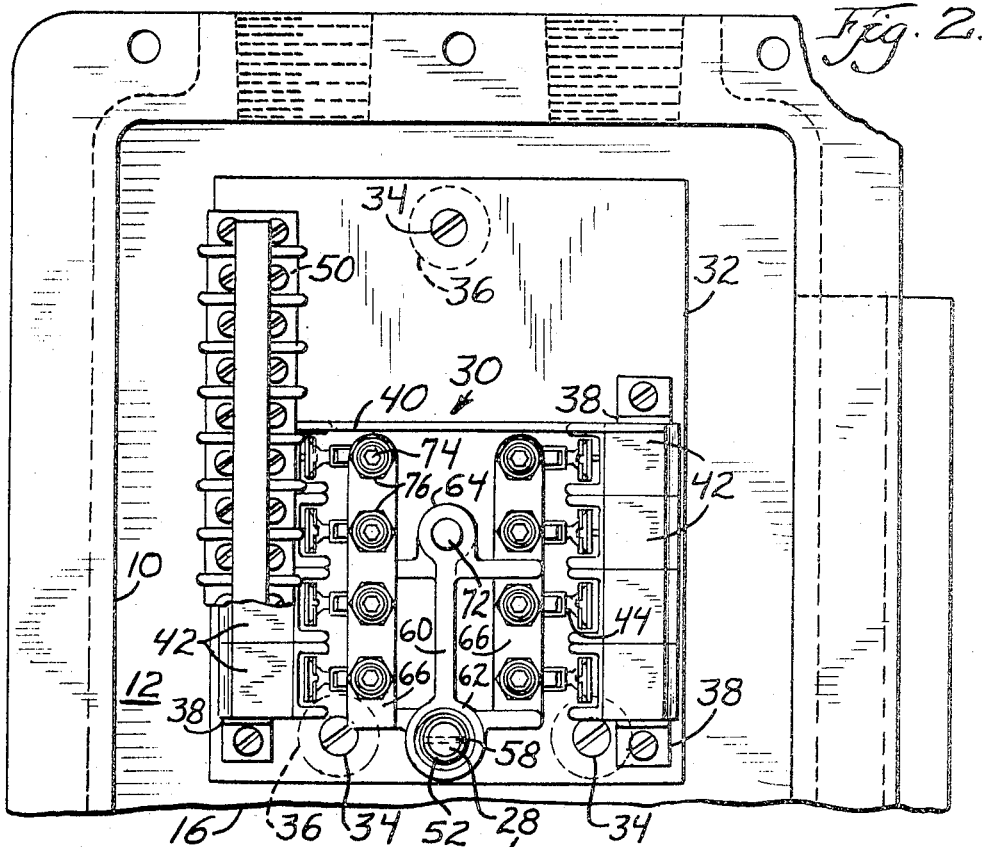
FIGURE 2 is an end elevation thereof.
Figure 3:
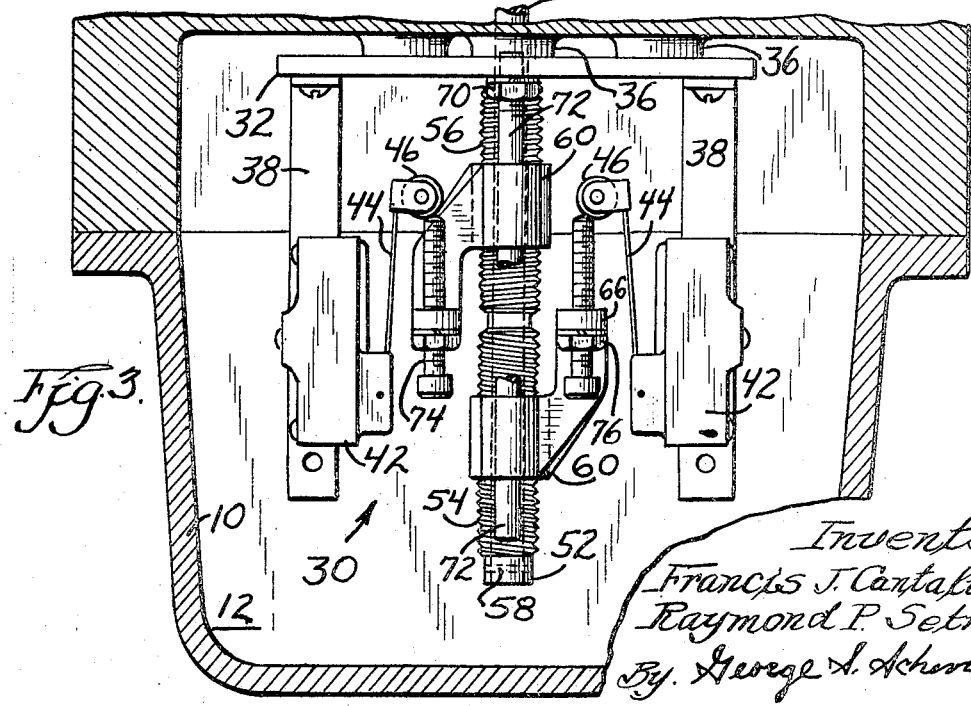
FIGURE 3 is a top plan view thereof.

As best seen in FIGURES 1, 2 and 3, the limit switch assembly 30 includes a base plate 32 which is attached to the wall 16 by screws 34 cooperating with suitably threaded lugs 36. Also attached to the base plate 32 by screws are four mounting brackets 38, the upper two of which are connected by a link or cross member 40. Held in place by the mounting brackets 38 are two banks of stacked limit switches 42. As best shown in FIGURE 3, the limit switches 42 are of the conventional cam-operable type, and each includes a resilient operating arm 44 attached to the main body of the switch, with a cam follower or wheel 46 at the free end thereof. When the wheel 46 of a particular switch 42 is displaced by a cam means, the resultant movement of the resilient arm 44 actuates the switch, causing the electrical contacts therein to open or close. Also mounted at the end of the mounting brackets 38, by means of a suitable angle member 48, is a standard screw-type terminal block 50 which provides electrical terminal connections between the limit switches 42 and the remaining control and indicator circuitry of the valve actuator.

Associated with the shaft 28 is a screw 52 having a left-hand thread portion 54 and a right-hand thread portion 56. The thread portions 54 and 56 may be formed, as shown, on a sleeve member which is then attached to the shaft 26 by means of a pin 58, or alternatively, the oppositely threaded portions of the screw 52 may be integrally formed on the shaft itself. Mounted on each of the thread portions 54 and 56 of the screw 52 is a cam carrier 60. As shown in detail in FIGURE 4, each of the cam carriers 60 includes an interiorly threaded nut portion 62, an apertured guide portion 64, and a laterally projecting arm portion 66 which has a number of threaded apertures 68 for accommodating cam means.

Attached to the base plate 32 by means of a nut 70 is a guide post or rod 72. The apertured guide portions 64 of the cam carriers 60 ride on the guide post 72. Threaded into the apertures 68 of the projecting arm portions 66 of the cam carriers 60 are a plurality of adjustable cam members 74 which, in this case, are Allen-headed adjusting screws. It will be noted that each of the cam members 74 has associated therewith a nut 76, which serves to lock the cam member in position after adjustment. It is understood that other means, such as self-locking cap screws or conventional locking springs, may be utilized in place of the nuts 76 to thereby lock the cam members 74 relative to the arm portions 66.

During actuation of the valving members, as for example during closing of the valve, the clutch 22 will rotate causing a corresponding rotation of the shaft 28 and the screw 52. As the screw 52 rotates in, for example, a clockwise direction (as viewed in FIGURE 2), the cam carriers 60 will move toward one another due to the opposite threading of the thread portions 54 and 56. In like manner, a counterclockwise rotation of the screw 52, as for example during opening of the valve, will cause the cam carriers 60 to move apart from one another along the length of the screw. The cooperation of the guide post 72 with the apertured guide portions 64 of the cam carriers 60 prevents the carriers from rotating with the screw 52, thus permitting the carriers to move therealong. As the cam carriers 60 move along the length of the screw 52, the cam members 74 make or lose contact with the cam followers 46, causing displacement of the operating arms 44 and consequent actuation of the limit switches 42. By suitable adjustment of the cam members 74 and proper selection of switches 42, any desired sequence of switch actuation may be programmed to control the various circuit control and indicator functions of the motor driven valve actuator. The carriers 60 may be positioned on one side of the screw 52 should housing configuration permit.

As can be appreciated from the foregoing, the novel limit switch assembly provides for a large and flexible switching capability in a relatively small space, which is most important in applications such as motor driven valve actuators. In addition, due to the fine adjustability of the cam means 74, and the positive mechanical linkage between the clutch shaft 22 and the screw 52, a highly precise sequential actuation program may be achieved. It will be understood, of course, that the number and spatial arrangement of the various components such as the limit switches 42, the cam carriers 60 and the cam means 74, may be varied over wide limits, depending upon such factors as the particular application contemplated, the amount of space available, and the complexity of the various circuit functions to be controlled. It is also understood that the linear travel of the cam followers is a function of the number of threads per inch on the thread portions 54, 56, and also the ratios established between gears 24, 26.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

We claim:
1. In a motor driven valve actuator including a motor, a driven shaft therefor, and valve actuating means adapted to be operated by said driven shaft, the combination thereof with a limit switch assembly comprising: a screw adapted to be rotated in accordance with actuation of said valve, said screw having first and second thread portions of similar pitch and of oppositely-handed threads; a plurality of cam-operable limit switches positioned in proximity to said screw, said switches arrayed in at least two banks, said banks being spaced from said screw on essentially opposite sides thereof; a plurality of cam carriers threadedly mounted on said screw for movement therealong, at least one of said carriers being mounted on each of said first and second thread portions; and cam means carried by said carriers and adapted to actuate said limit switches, said cam means being adjustable with reference to said carrier.

2. The combination of claim 1, wherein said limit switch assembly includes guide means cooperatively associated with said cam carriers for preventing rotational movement thereof.

3. The combination of claim 1, wherein said cam carriers include an interiorly threaded nut portion, an apertured guide portion, and a laterally projecting arm portions.

4. The combination of claim 3, wherein said cam means consist of headed screw threaded through said arm portions in a direction essentially parallel to the direction of travel of said carriers.

5. A valve actuator comprising: a motor, a shaft driven by said motor; valve actuating means adapted to be operated by said shaft; electric circuit means for controlling said motor and indicating the operation of said actuating means, said circuit means including a plurality of limit switches, said limit switches arrayed in two spaced banks, said banks being spaced from said screw on opposite sides thereof; a screw positioned adjacent said limit switches and adapted to be rotated in accordance with the operation of said actuating means, said screw having a right-hand thread portion and a left-hand thread portion of similar pitch; a pair of interiorly threaded cam carriers, one mounted on said right-hand thread portion and one on said left-hand thread portion, whereby rotation of said screw causes movement of said carriers in opposite directions therealong; guide means for preventing rotational movement of said carriers; and adjustable cam means on said carriers for actuating said limit switches.

References Cited
UNITED STATES PATENTS

| | | | |
|---|---|---|---|
| 2,898,281 | 8/1959 | Untermyer et al. | 74—89.15 |
| 2,902,885 | 9/1959 | Wright | 74—625 |
| 2,951,460 | 9/1960 | Pierson | 74—89.15 |

FRED C. MATTERN, JR., Primary Examiner

WESLEY S. RATLIFF, JR., Assistant Examiner

U.S. Cl. X.R.

74—424.8